United States Patent [19]

Young

[11] 4,137,163

[45] Jan. 30, 1979

[54] TREATMENT OF VEGETABLE TANNING WASTES

[75] Inventor: Harland H. Young, Western Springs, Ill.

[73] Assignee: Eberle Tanning Company, Westfield, Pa.

[21] Appl. No.: 816,498

[22] Filed: Jul. 18, 1977

[51] Int. Cl.$^2$ .......................... C02B 1/20; C02C 5/02
[52] U.S. Cl. ........................................ 210/44; 210/53; 210/54; 210/56
[58] Field of Search ................ 210/42 R, 44, 45, 47, 210/48, 51–54, 56

[56] References Cited

U.S. PATENT DOCUMENTS

| | | | |
|---|---|---|---|
| 1,263,532 | 4/1918 | Cummings | 210/44 |
| 2,350,111 | 5/1944 | Hood | 210/53 |
| 2,860,987 | 11/1958 | Werner | 210/54 |
| 3,009,873 | 11/1961 | Kerr | 210/54 |
| 3,419,493 | 12/1968 | Pangle | 210/45 |
| 4,013,555 | 3/1977 | Davis | 210/53 |

*Primary Examiner*—Charles N. Hart
*Assistant Examiner*—Peter A. Hruskoci
*Attorney, Agent, or Firm*—Leydig, Voit, Osann, Mayer & Holt, Ltd.

[57] ABSTRACT

Highly colored tannin bodies and other suspended solids are separated from highly alkaline vegetable tannery waste effluent by scrubbing hot combustion gas with the effluent, introducing polyacrylamide flocculant into the effluent either immediately before scrubbing or during scrubbing, and separating floatable foam and settleable solids from the effluent after scrubbing. The effluent may be treated with a soluble salt of a trivalent metal before scrubbing to act as a primary flocculant.

6 Claims, 1 Drawing Figure

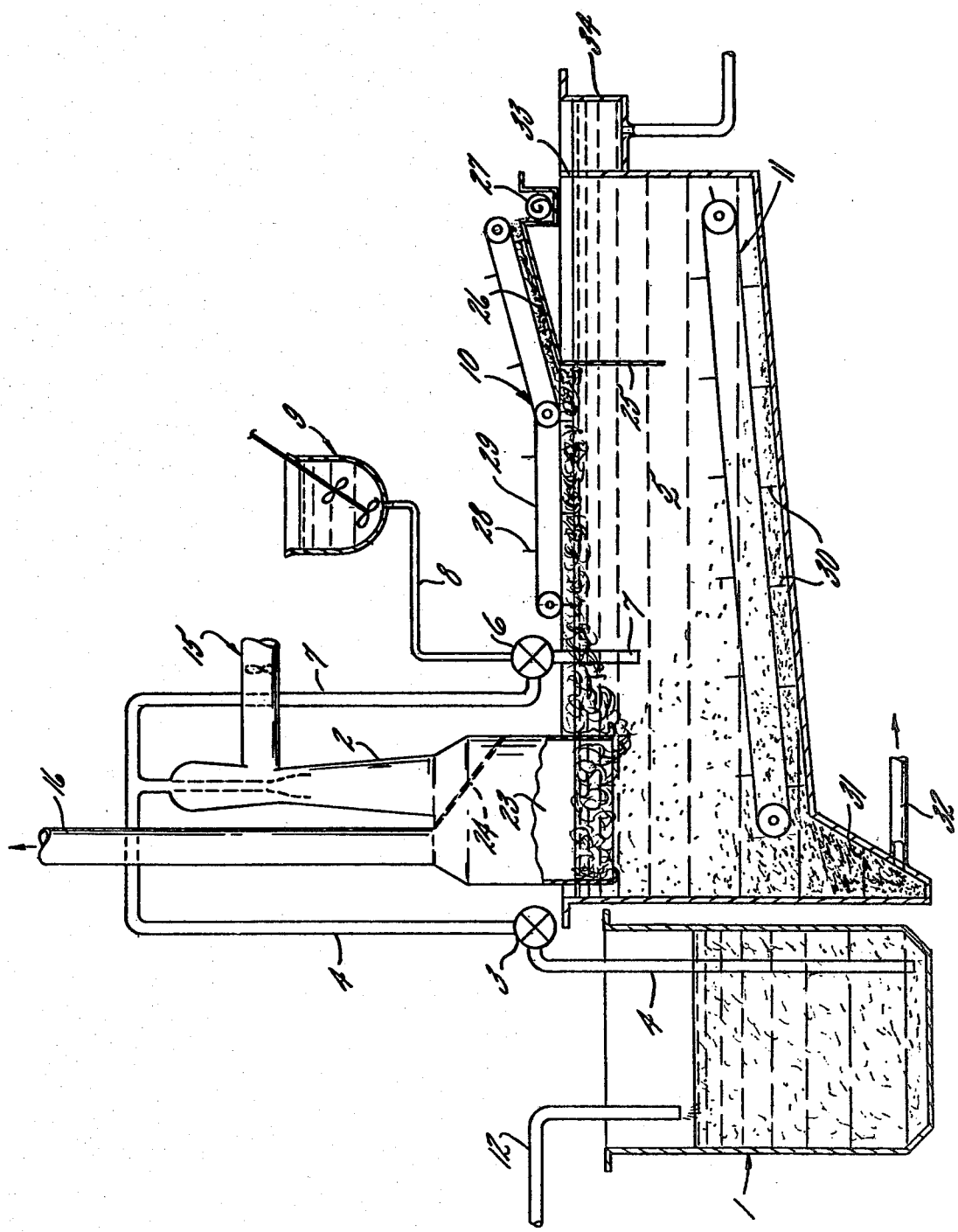

TREATMENT OF VEGETABLE TANNING WASTES

BACKGROUND AND OBJECTS OF THE INVENTION

This invention relates to the treatment of effluent waste streams normally discharged by tanneries that manufacture sole, harness, saddle, and other leathers using vegetable extract tannins. Tanneries engaged in the production of leather are based upon chrome tannage, vegetable extract tannage, or a combination of both. In combination tannage, the extract or its equivalent is used as a retanning agent after chrome tanning has taken place. Sometimes the sequence is reversed.

Most of the waste streams that are discharged by vegetable extract tannaries are quite similar to the ones discharged by chrome tanneries. Soaking, washing, dehairing, (hair pulping or hair saving), liming and reliming, bating, pickling, fat liquoring, coloring and finishing introduce lime, sulfides, amines, proteins, soluble salts of ammonia, sodium and calcium, emulsified fats, oils and waxes, traces of dyes, pigments, and coloring materials into the final waste streams of both vegetable tanneries and chrome tanneries. All of these streams except the final pickling and tanning steps are predominantly alkaline, and the waste streams from dehairing and liming are strongly alkaline. Therefore, the composite waste effluent is predominantly alkaline. conventional procedures that are used for treatment of such waste streams include:

(1) preliminary screening or sieving of tannery wastes to remove hair, flesh strings, and particulate solids;
(2) primary settling to remove floatables by skimming and remove settleable solids as sludge;
(3) equalization of streams to permit the treatment of a more or less uniform effluent flow;
(4) use of manganese salts to catalytically oxidize sulfides by aeration at the ambient high pH with simultaneous displacement of free ammonia;
(5) a second clarification to remove grease released by aeration and remove additional precipitated solids;
(6) the use of flocculants to aid and abet the coalescence and settling of precipitated solids; and
(7) neutralization of the final primary effluent by the incorporation of acidic substances.

Notwithstanding the similarities in many of the waste streams found in chrome and vegetable tanneries, certain problems arise in the primary treatment of vegetable tanning waste streams that are not encountered in chrome tannage operations. The conventional treatment methods are not entirely adequate to deal with these special problems, which arise due to the presence of soluble vegetable tannin materials in the waste effluent.

Numerous extracts are commonly used in vegetable tanneries and are prepared from a number of tree barks or the wood itself. Among the more important of these are quebracho, chestnut, mangrove, wattle, spruce, oak, hemlock, etc. Certain nuts or pods such as myrobalans, valonia, and divi-divi have also been processed. All of these vegetable substances yield tannins in greater or lesser amounts when extracted with boiling or hot water. These tannin solutions are then used in vegetable tanneries to convert a prepared hide or skin into leather using numerous steps and operations that comprise the tanner's art.

Vegetable tannins have little color at the lower pH values (pH about 3.0) which prevail under the initial conditions of their use. Under these conditions, their color may range from pink to light brown. At the prevalent pH of a final composite tannery waste effluent (pH about 11-12), however, the vegetable tannins are readily oxidized, and become deep red or even very deep red-violet. It is necessary to remove substantially all of these color bodies in order to produce an effluent that will not produce deep colorations when the effluent enters the receiving stream. This necessity poses a significant problem, because it is virtually impossible to keep the vegetable tannin materials from entering the waste effluent, secondary "activated sludge" treatment is not effective to remove the color bodies, and removal of the bodies by primary treatment methods has been a slow and inefficient process.

As in many other industrial chemical processes, particularly those in which chemicals are absorbed by a substrate, there is rarely a complete utilization of the absorbed reagents whether it be tannin or some other chemical substance. As a result, recycling is a common practice so as to avoid waste, and this is done so long as excessive dilution does not render the cost prohibitive, but an inevitable quantity is discharged. The following operations for example result in introduction of the vegetable tannin materials into the final waste effluent:

a. Drippage and draining of vegetable tanned stock.
b. Drying of vegetable tanned leather promotes surface oxidation which in many cases produce very dark colored areas. This requires a subsequent alkaline wash to redissolve the objectionable colorations followed by an "acid bleach" from which operations, the waste streams contain further quantities of the troublesome "red waters".
c. When spent extract liquors from any operation contain insufficient tannin to justify concentration and recovery, they too find their way into the waste streams to further plague the primary treatment of tannery effluents.

When such discharges take place, the extract material reacts with numerous other tannery waste streams to produce soluble color bodies, which must then be removed.

Even though excess vegetable extracts are precipitated by increased pH values due particularly to lime or magnesia, the precipitated particles do not settle rapidly enough to be removed through normal clarifier operations. In fact, precipitation of "reds" by lime under alkaline conditions requires many days or weeks of settling before an effluent of suitable color can be discharged to the receiving waterway. Such a process requires many acres of sludge lagoons.

The use of many varieties of flocculants has not been effective in speeding up the sedimentation step to any appreciable degree. Normal use of anionic polyacrylamide type flocculants does not promote satisfactory coalescence of the precipitate. Simultaneous use of iron salts as primary flocculants produces deep blue-black inks when the vegetable tannins are present. Aluminum and chromium salts, while producing no discoloration, are not very effective. Vegetable tannins react with the precipitate proteinaceous materials, but these dispersed solids are again too finely divided to settle out, and they do not lend themselves to efficient flocculation.

A principal object of the present invention is to provide a process for treating the waste effluent of vegetable tanning operations that will quickly and efficiently remove substantially all of the deep red color bodies.

Another object of the invention is to provide such a process which will efficiently remove other suspended solids from tannery waste effluents. Another object is to provide such a process in which iron salts may be used as flocculants without producing a final effluent that has dark blue-black colorations.

Other objects and advantages of the invention will become apparent in the following detailed description and in the drawing, in which:

The FIGURE is a schematic diagram which illustrates the practice of the present invention using exemplary apparatus.

While the invention is described in connection with a preferred embodiment, it will be understood that I do not intend to be limited to this particular embodiment but intend, on the contrary, to cover the various alternatives and equivalents included within the spirit and scope of the invention.

SUMMARY AND DETAILED DESCRIPTION OF THE INVENTION

It has now been discovered that an anionic high molecular weight polymer of acrylamide can be made to produce a readily separable floc that permits substantially complete separation of suspended solids and red color bodies from alkaline tannery waste effluents that contain vegetable tannin materials. In accordance with the invention, the waste effluent is interacted with hot combustion gases resulting from the burning of gas, oil, coal, wood or other combustibles, and 4 to 8ppm of polymeric flocculant is either added into the interaction zone or added to the effluent before the interaction. Interaction with combustion gases can be effected in any of the several known types of scrubbing devices. For example, in a scrubbing tower where the waste stream is sprayed into the scrubbing chamber countercurrent to the flow of combustion gases, a suitable floc forms that can be separated.

A Venturi type scrubber is particularly suitable for practice of this invention because the high velocity and extreme agitation which characterize this device prevent formation of lime deposits. Care must be taken, however, to assure that the floc is not subjected to destructive agitation. To avoid this, it is desirable to introduce the polymer into the effluent immediately before scrubbing or to introduce it directly into the scrubbing chamber.

One procedure for successful introduction of the polymer is to convey the required amount to the vicinity of the scrubbing zone and spray it into the zone concurrently or countercurrently to the liquid flow so as to achieve efficient distribution throughout the scrubbing liquid. Another successful procedure is to recycle treated effluent through the scrubber, metering polymer into the rapidly moving recycle stream, and combining the recycle stream with the primary effluent stream immediately before the primary stream reaches the scrubbing zone. In this procedure, the polymer solution can be introduced into the suction side of the pump that delivers the recycle effluent stream.

Depending upon the velocity of the effluent and recycle effluent streams and upon the amount of gasification that occurs during scrubbing, an abundance of gas is trapped in the effluent and a copious foam is produced. Without the polymeric flocculant, this foam surfaces as a fine voluminous foam that appears to contain few, if any, of the precipitated "reds". The addition of the polymer just prior to or during gasifiction immediately changes the nature of the foam so that specks of the precipitated reds are readily apparent and distribute themselves throughout the foam. It has been found that these reds, along with other light sludge, become entrapped by the foam and are removable by skimming. Other reds and flocculated solids sink and are removable as heavy sludge.

When destructive agitation of the floc is avoided, the foam containing the floc compacts as its flow is restricted and it has the property of being compressible to an easily handleable paste. If the polymer is not introduced immediately before or during scrubbing, the gassed waste may remain in the form of a fine textured foam rather than compacting. In that case the foam is difficult to remove from the effluent and it produces troublesome air-locks when attempts are made to convey it through pipes.

It has also been found that the temperature of the effluent affects the settling of heavier solids and the degree of compaction attained by the foam. An optimum range of about 100-120° F can be achieved by recycling the effluent through the scrubber.

In accordance with a further aspect of this invention, iron salts or other soluble salts of trivalent metals may be used as primary flocculants. Unexpected results are obtained by the use of iron salts. They were first used in the absence of any tannin waters (red wastes) to aid and promote the precipitation of proteins in the waste stream. However, they formed colloidally dispersed ferrous sulfide in spite of a preliminary treatment with manganese to catalyze oxidation. The ferrous sulfide contributed a deep green or blue-black color, which was not eliminated when the effluent was clarified. This occurred with effluent that contained no tannins when no interaction with combustion gas was provided. Scrubbing with flue gases in the absence of tannins still failed to improve or remove the dark colorations. However, in the presence of some vegetable tannin material, a small amount of soluble iron salts exerts the unexpected effect of reacting with the finely divided dispersed solids, so that after reaction of the effluent with flue gases, a sludge is produced that either sinks rapidly or rises rapidly as an easily compacted floating foam. The apparent change is noticed first by a sharp increase in the deep purple color of both the compacted foam and the precipitated sludge. Simultaneously an improved clarity is noted in the clarified effluent with total absence of pink, red, or brown colorations. These advantages are optimized with the use of at least 100 ppm of iron salts (such as iron sulfate), at least 4ppm of polyacrylamide flocculant, and an efficient reaction with flue gases at elevated temperatures above 85° F. More preferably, the temperature of the effluent should be raised to 100-120° F.

Other salts which may be used as primary flocculants include soluble salts of trivalent metals, such as chromium and aluminum salts. At least about 35 ppm of the primary flocculant are necessary before a significant benefit is obtained, and preferrably at least 100 ppm should be used.

The various factors responsible for the success of the process of this invention are not known, but the results are possibly explained by the effects of finely divided precipitated calcium sulfites and carbonates, which result from scrubbing of the combustion gas. It is believed that the reds may be absorbed or adsorbed on these sulfite and carbonate particles and that these may coflocculate. This has not been proved other than by demonstration that the same flocculant in the same amount when added to the same waste material does not effect a satisfactory separation of the insolubles from the disperse medium. Yet after gasing with flue gases, the dispersed phase can be readily separated to produce a clarified effluent substantially free from red color bodies and suspended solids.

The reducing atmosphere of the flue gases ($CO—SO_2—CO_2—H_2O$) appears to be an important factor in obtaining the much improved flocculation of precipitated reds. This reaction environment is enhanced by the high temperature of the flue gases and the alkalinity of the aqueous phase.

Additional benefits of the process of the present invention are that the intensive reaction between hot flue gases and the alkaline wastes effects substantial removal of ammonia vapors and effects interaction of sulfides with sulfur dioxide to produce elemental sulfur, even in the absence of manganese catalyst. Another benefit is that the sludge removed from the treated effluent has value as an agricultural lime and humus forming material after it has been dewatered.

The FIGURE is a schematic diagram of illustrative apparatus for use in the practice of a preferred embodiment of this invention. There is shown: an equalization reservoir 1 for collection and preliminary treatment of tannery waste effluent; a scrubbing device 2 for gassification of the waste effluent; a pump 3 for pumping the effluent from the equalization tank through a primary feed line 4 to the head of the scrubbing device; a clarification tank 5 for receiving the effluent after it has passed through the scrubbing device; a recirculation pump 6 for pumping a portion of the effluent that has collected in the clarification tank through a recirculation line 7 to the head of the scrubbing device; a polymer feed line 8 for carrying polyacrylamide flocculant solution from a polymer feed tank 9 to the suction side of the recirculation pump; a skimming device 10 for removing floatable material from the clarification tank; and a sludge raking device 11 for removing settleable matter from the clarification tank.

The tannery waste flows from the plant discharge line 12 into the equalization reservoir 1, where the effluent becomes more or less equalized as to composition while being treated with manganese sulfate to catalyze oxidation of sulfides, and iron sulfate or some other soluble salt of a trivalent metal to act as a primary flocculant. Agitation with air is provided to prevent settling of any settleable solid particulates and effect the catalytic oxidation. The equalized waste is a dark chocolate colored suspension.

A stream of the equalized waste is pumped through the primary feed line 4 and introduced into the scrubbing device in combination with a stream of effluent that is recycled from the clarification tank via the recirculation line 7. Recycling maintains a sufficient flow of effluent for efficient scrubbing, and it permits control of the pH and temperature of the treated effluent. In this embodiment the recycle stream is also used for introducing the polyacrylamide flocculant into the scrubbing zone. Polymer solution is added to the recycle stream via the suction side of the recirculation pump 6. The polymer solution is thereby diluted for maximum dispersion and flocculation efficiency. Due to the high rate of flow in the recirculation line, the polymer is almost immediately introduced into the scrubbing device. The amount of polymer solution that is added should be sufficient to provide 4 to 8ppm of polymer in the composite effluent stream that enters the scrubbing device.

The scrubbing device 2 is shown here as a Venturi type scrubber, but other types are equally suitable. Flue gas is sucked into the scrubber through the breach 15, and is scrubbed with the composite effluent stream. The scrubbing removes sulfur dioxide and carbon dioxide from the flue gas and thereby lowers the pH of the effluent from about 11—12 to about 8-9. At the same time, an abundance of gas is trapped in the effluent, producing a copious foam. The flue gas exits from the scrubber through a stack 16 after it has been scrubbed.

The base of the scrubbing device extends beneath the effluent level in the clarification tank 5, producing a water seal chamber 23 at the base of the scrubber. After scrubbing, the waste passes through a grid 24, which starts foam break-up; and the foam then falls into the water seal chamber. As it passes out under the seal the foam is compacted and compressed. This foam carries entrapped lighter sludge, and floats sharply to the surface of the clarification tank effluent.

This foam is held back and prevented from overflowing out of the tank by a beach baffle 25, which extends below the surface of the effluent for two or three feet and extends above the surface onto a sloping beach 26 that leads to a conveyor trough 27. As the foam approaches the beach, skimmer blades 281 that operate on an endless belt 29 control the movement of the foam toward the beach, causing the foam to coalese and densify. The consistency of the foam changes from a froth to a paste and becomes increasingly dark-red brown as the solids content due to precipitated reds rises to eight to ten percent solids. When the foam reaches the beach, the skimmer blades continue to compress the foam, pushing it up the beach until it drops into the conveyor trough 27. The foamed sludge is further de-aerated in the trough by the screw conveyor which carries the foam to a dewatering device, where it may be combined with heavier sludge that is removed from the bottom of the clarification tank.

Heavier sludge components that sink to the bottom of the clarification tank are removed by sludge rakes which operate on an endless belt to plow the sludge into a sludge pit 31. The heavy sludge is pumped from the sludge pit through a sludge removal line 32 to a suitable dewatering device, such as a filter device or a sludge lagoon.

The clarified effluent passes under the beach baffle 25 and over the final weir 33 into a launder 34. It then flows or is pumped to a secondary biological treatment area, such as an aeration lagoon. The clarified effluent obtained by the present invention is ideally conditioned for the biological treatment system, because it is preheated to a warm temperature and is neutralized. This is a further tremendous advantage of this system.

The invention and the various factors affecting its successful practice are further described and explained by the following examples. In each of the examples the raw waste was treated with manganese sulfate and aerated in an equalization reservoir prior to being introduced into the final treatment unit.

EXAMPLE I

A composite waste that contained no spent tannins (reds) was aerated in the equalization reservoir in the presence of manganese sulfate (100ppm), and was clarified without the addition of any iron salt or polymeric flocculant. This waste was pumped through the flue-gas scrubber and clarified by one-hour detention. Comparison of raw and clarified waste is shown by the following analyses:

|  | Raw | Clarified |
| --- | --- | --- |
| BOD | 1850ppm | 1600ppm |
| Suspended Solids | 3600 | 1800 |
| Ammonia N$_2$ | 600 | 410 |
| Kjeldahl Nitrogen | 490 | 420 |
| Sulfides | 240 | 48 |
| pH | 11.5 | 9.0 |
| Temperature | 70° F | 90.0° F |

Excessive foaming could not be controlled and much of the foam excaped under the beach baffle, so that escaped sludge explains the high level of suspended solids in the clarified effluent. Color of effluent was very turbid and gray and contained considerable non-settleable solids.

EXAMPLE II

A waste effluent similar to that treated in Example I was aerated in the presence of manganese sulfate (100ppm) and treated with 4ppm of Dow Separan AP 273 by introducing a 0.2% solution into the suction line of a 250gpm pump delivering recycled waste to the flue gas scrubber, thereby effecting a two hundred fifty to one dilution of the flocculant solution. The foam that emerged from the scrubbing zone began to condense or compact, thus reducing the amount of sludge and foam that slipped under the beach baffle. A comparison of raw and clarified waste is shown by the following analyses:

|  | Raw | Clarified |
| --- | --- | --- |
| BOD | 2200 | 1320 |
| Suspended Solids | 2950 | 1200 |
| Ammonia N$_2$ | 400 | 300 |
| Kjeldahl Nitrogen | 510 | 390 |
| Sulfides | 210 | 30 |
| pH | 11.8 | 9.1 |
| Temperature | 72° F | 90° F |

There was a marked improvement in the clarified effluent but its quality was still unsuitable. Color was light but there was considerable turbidity probably due to colloidal sulfur.

EXAMPLE III

A similar composited waste as in the first two examples was additionally treated with a small quantity of spent vegetable tanning liquors from the tan yard color vats corresponding to the normal proportion of spent red waters in the total plant waste (15-20%). The effluent was again treated with 4ppm of polymeric flocculant. Immediately after scrubbing the foam appeared to develop dark brown specks which rapidly coalesced as the foam was detained by the skimmer flights. Further compaction of the foam took place as it was moved forward and up the beach into the discharge conveyor trough. A sample of the floating material was taken from the trough and was found to contain 8-10% solids comprising dark red tannins, proteins, and fat. The tremendous improvement in the quality of the clarified effluent is shown by the following analyses:

|  | Raw | Clarified |
| --- | --- | --- |
| BOD | 2000 | 1200 |
| Suspended Solids | 3180 | 400 |
| Ammonia N$_2$ | 340 | 290 |
| Kjeldahl Nitrogen | 530 | 300 |
| Sulfides | 240 | 25 |
| pH | 11.2 | 8.8 |
| Temperature | 78° F | 98° F |

The effluent was more clear but exhibited a brown color.

EXAMPLE IV

This example further demonstrates the pronounced synergistic effect of spent tannins in the waste along with polymer treatment prior or during the scrubbing of flue gases. Composited waste containing all components normally present in a sole leather tannery including tannin waste liquors etc. was treated with 4ppm of polyacrylamide polymer (Dow Separan AP273). The waste was then used to scrub flue gases and discharged to a clarifier similar that shown in FIG. 1. The synergistic effect is apparent when comparing the following analysis with those of EXAMPLES I, II, and III.

|  | Raw | Clarified |
| --- | --- | --- |
| BOD | 2700 | 1050 |
| Suspended Solids | 3940 | 180 |
| Ammonia N$_2$ | 320 | 220 |
| Kjeldahl Nitrogen | 460 | 200 |
| Sulfides | 275 | 10 |
| pH | 11.4 | 8.6 |
| Temperature | 74° F | 100° F |

Color of the effluent was light brown with little if any apparent suspended solids.

EXAMPLE V

A portion of the same waste used in Example IV was processed in the laboratory. The waste contained tannins at the same level as Example IV, and was treated with the same level of polymeric flocculant. Treatment was effected without scrubbing flue gases. To compensate for the absence of heating and neutralization by flue gases, sulfuric acid was added to adjust the pH to 8.6 and the sample was warmed to 100° F prior to addition of flocculant. After addition of the polymer, the floc formed and a sludge sank to the bottom of the container, but no foam was produced in the absence of scrubbing. Clarity was much inferior to Example IV as shown by suspended solids of 650ppm in the clarified sample. Example V demonstrates the necessity of flue gas scrubbing to effect the clarification claimed in the instant invention. Considerable reddish brown coloration in the effluent with poor clarity.

EXAMPLE VI

This example portrays the further improvement in clarified effluent when iron salts are added to the waste containing tannins (reds) prior to scrubbing the flue gases. Total composite tannery waste, containing all normal waste streams from hide washing, dehairing, liming, bating, blanching, vegetable tanning, scrubbing, stuffing and other operations done in a sole leather tannery, was treated with 100ppm of manganese sulfate, 100ppm of iron sulfate and aerated three hours in an equalization basic prior to pumping through the Venturi flue gas scrubber. 4ppm of polymeric flocculant (Dow Separan AP 273) was introduced into the suction side of the pump delivering waste to the scrubber.

When the foam passed out of the scrubber and into the clarifier, it was found that it was now a deep purple color, very dense, and easily compacted as it ws delivered to the sludge line. After separation of settleable and floatable matter, the effluent was sparkling clear and had a very light straw color totally devoid of any pink or reddish color. This is borne out by the following analyses:

|  | Raw | Clarified |
|---|---|---|
| BOD | 2580 | 1000 |
| Suspended Solids | 2975 | 72 |
| Ammonia $N_2$ | 310 | 175 |
| Kjeldahl Nitrogen | 535 | 290 |
| Sulfides | 210 | 0 |
| pH | 11.7 | 8.4 |
| Temperature | 72° F | 109° F |

EXAMPLE VII

This example shows the effect of temperature on the clarity of the effluent. The composite waste in the equalization basin was approximately the same as that in Example VI and was treated exactly the same insofar as levels of tannins, iron, polymeric flocculant, and pH were concerned. The only variable was that of temperature which was controlled by recycling the waste through the scrubber until the temperature had risen to 120° F. Then the composite waste was pumped through the scrubber with a minimum of recycling, whereby the temperature was allowed to fall from a high of 120° F down to 90° F, samples being drawn every 5° drop and tested for suspended solids. Results were as follows:

| Temperature | Suspended Solids |
|---|---|
| 120° | 60 |
| 115 | 110 |
| 110 | 140 |
| 105 | 175 |
| 100 | 200 |
| 95 | 225 |
| 90 | 240 |

It is apparent that, as a general rule, there is improved clarification as temperatures rise from 90° to 120°. Waste treatment units are typically operated out-of-doors, so depending upon climatic conditions, the temperature levels may vary widely in practice. Therefore, the normal temperature range in the final clarifier will vary from 90-95° in the winter to 110-120° in the summer. Color and clarity improved with rise in temperature.

I claim as my invention:

1. A process for removing suspended solids and color bodies from alkaline liquid tannery waste effluent containing colored vegetable extract tannin bodies which comprises the steps of:
   (a) treating the effluent with at least about 4ppm of a polyacrylamide flocculant;
   (b) scrubbing a hot combustion gas with the treated effluent from (a) to at least partially reduce the alkalinity of said effluent and to produce floatable foam that entraps non-settleable floc, said scrubbing being continued until the temperature of said effluent is raised to at least about 85° F and the alkalinity of said effluent is reduced to a pH below about 10;
   (c) separating floatable and settleable matter from the effluent.

2. The process of claim 1 in which said treatment comprises the addition to the effluent of between about 4 and 8ppm of the flocculant, and said scrubbing is continued until the temperature of the effluent is raised to between 100 and 120° F.

3. A process for removing suspended solids and color bodies from liquid alkaline tannery waste effluent containing colored vegetable extract tannin bodies which comrises the steps of:
   (a) treating the effluent with at least about 4ppm of polyacrylamide flocculant and at least about 35ppm of a soluble salt of a trivalent metal,
   (b) scrubbing a hot combustion gas with the treated effluent from (a) to at least partially reduce the alkalinity of said effluent and to produce a floatable foam that entraps non-settleable floc, said scrubbing being continued until the temperature of said effluent is raised to at least about 85° F and the alkalinity of said effluent is reduced to a pH below about 10; and
   (c) separating settleable matter and said floatable foam from the effluent.

4. The process of claim 3 in which said treatment in step (a) comprises addition of between 4 and 8ppm of said flocculant and at least about 100ppm of said soluble salt to the effluent.

5. The process of claim 5 in which said scrubbing raises the temperature of the effluent to between 100° F and 120° F.

6. The process of claim 5 in which the soluble salt comprises iron sulfate.

* * * * *